United States Patent
Abbas et al.

(10) Patent No.: US 11,218,676 B2
(45) Date of Patent: Jan. 4, 2022

(54) METHODS AND APPARATUS FOR PROJECTION CONVERSION DECODING FOR APPLICATIONS ECO-SYSTEMS

(71) Applicant: GoPro, Inc., San Mateo, CA (US)

(72) Inventors: Adeel Abbas, Belmont, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/020,362

(22) Filed: Sep. 14, 2020

(65) Prior Publication Data

US 2020/0413017 A1     Dec. 31, 2020

Related U.S. Application Data

(62) Division of application No. 16/212,408, filed on Dec. 6, 2018, now abandoned.

(60) Provisional application No. 62/596,627, filed on Dec. 8, 2017.

(51) Int. Cl.
| | | |
|---|---|---|
| H04N 9/31 | (2006.01) | |
| H04N 5/232 | (2006.01) | |
| G06T 15/20 | (2011.01) | |

(52) U.S. Cl.
CPC ........... *H04N 9/3185* (2013.01); *G06T 15/20* (2013.01); *H04N 5/23238* (2013.01)

(58) Field of Classification Search
CPC ... H04N 9/3185; H04N 5/23238; G06T 15/20
See application file for complete search history.

(56) References Cited

U.S. PATENT DOCUMENTS

| | | | |
|---|---|---|---|
| 8,319,789 B2 | 11/2012 | Koguchi | |
| 9,860,509 B2* | 1/2018 | Paczkowski | H04N 13/106 |
| 11,019,257 B2* | 5/2021 | Zhou | G06T 3/4038 |
| 2008/0288600 A1* | 11/2008 | Clark | H04N 21/6175 |
| | | | 709/206 |
| 2015/0009227 A1 | 1/2015 | Loeffler | |
| 2016/0148594 A1* | 5/2016 | Wang | H04N 21/440263 |
| | | | 725/62 |
| 2016/0323561 A1 | 11/2016 | Jin | |
| 2018/0249164 A1 | 8/2018 | Kim | |
| 2018/0262775 A1* | 9/2018 | Lee | H04N 19/597 |
| 2019/0068879 A1* | 2/2019 | Bao | G06T 3/4038 |
| 2019/0089950 A1* | 3/2019 | Serrano Vergara | H04N 13/398 |
| 2019/0162823 A1* | 5/2019 | Eckstein | G01C 21/28 |
| 2019/0222823 A1* | 7/2019 | Clagg | H04N 13/194 |

(Continued)

*Primary Examiner* — Oschta I Montoya
(74) *Attorney, Agent, or Firm* — Esplin & Associates, PC

(57) ABSTRACT

Apparatus and methods for projection conversion decoding for applications eco-systems are disclosed. In one embodiment, a decoder apparatus is utilized to read formatting information from an intermediate projection format; convert the intermediate projection format to a display projection format; apply a rotation operation to the display projection format in accordance with the reading of the formatting information; and transmit the display projection format for use by an application. In some implementations, the intermediate projection format has been stabilized prior to encoding in order to improve upon the encoding efficiency for the intermediate projection format. The application of the rotation operation may then be utilized to reverse the stabilized imaging data. Methods and computing systems are also disclosed.

16 Claims, 6 Drawing Sheets

(56) References Cited

U.S. PATENT DOCUMENTS

2020/0053393 A1* 2/2020 Niamut .................... G06T 7/90
2020/0074587 A1* 3/2020 Lee ....................... G06T 3/005

* cited by examiner

METHODS AND APPARATUS FOR PROJECTION CONVERSION DECODING FOR APPLICATIONS ECO-SYSTEMS

PRIORITY

This application claims the benefit of priority to co-owned U.S. patent application Ser. No. 16/212,408 filed Dec. 6, 2018 entitled METHODS AND APPARATUS FOR PROJECTION CONVERSION DECODING FOR APPLICATIONS ECO-SYSTEMS", which claims the benefit of priority to co-owned U.S. Provisional Patent Application Ser. No. 62/596,627 filed Dec. 8, 2017 of the same title, each of which is incorporated herein by reference in its entirety.

RELATED APPLICATIONS

This application is related to U.S. Provisional Patent Application Ser. No. 62/583,991 filed Nov. 9, 2017 and entitled "Methods and Apparatus for Block-Based Layout for Non-Rectangular Regions between Non-Contiguous Imaging Regions", the contents of which are incorporated herein by reference in its entirety.

This application is also related to U.S. patent application Ser. No. 15/719,291 filed Sep. 28, 2017 and entitled "Methods and Apparatus for Providing In-Loop Padding Techniques for Rotated Sphere Projections", which claims the benefit of priority to U.S. Provisional Patent Application Ser. No. 62/481,013 filed Apr. 3, 2017 and entitled "Video Coding Techniques for Rotated Sphere Projections", the contents of which are incorporated herein by reference in its entirety.

This application is also related to U.S. patent application Ser. No. 15/665,202 filed Jul. 31, 2017 and entitled "Methods and Apparatus for Providing a Frame Packing Arrangement for Panoramic Content", which claims the benefit of priority to U.S. Provisional Patent Application Ser. No. 62/477,936 filed Mar. 28, 2017 of the same title; U.S. Provisional Patent Application Ser. No. 62/473,952 filed Mar. 20, 2017 of the same title; U.S. Provisional Patent Application Ser. No. 62/465,678 filed Mar. 1, 2017 of the same title; U.S. Provisional Patent Application Ser. No. 62/462,804 filed Feb. 23, 2017 of the same title; and U.S. Provisional Patent Application Ser. No. 62/446,297 filed Jan. 13, 2017 and entitled "Methods and Apparatus for Rotated Sphere Projections", each of the foregoing being incorporated herein by reference in its entirety.

This application is also related to U.S. patent application Ser. No. 15/289,851 filed Oct. 10, 2016 and entitled "Apparatus and Methods for the Optimal Stitch Zone Calculation of a Generated Projection of a Spherical Image", which is incorporated herein by reference in its entirety.

This application is also related to U.S. patent application Ser. No. 15/234,869 filed Aug. 11, 2016 and entitled "Equatorial Stitching of Hemispherical Images in a Spherical Image Capture System", which claims the benefit of priority to U.S. Provisional Patent Application Ser. No. 62/204,290 filed on Aug. 12, 2015, each of the foregoing being incorporated herein by reference in its entirety.

This application is also related to U.S. patent application Ser. No. 15/406,175 filed Jan. 13, 2017 and entitled "Apparatus and Methods for the Storage of Overlapping Regions of Imaging Data for the Generation of Optimized Stitched Images", which is also incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to video image processing and in one exemplary aspect, to methods and apparatus for providing projection conversion decoding techniques for use in, for example, legacy applications ecosystems.

Description of Related Art

Panoramic images (e.g., spherical images) are typically obtained by capturing multiple images with overlapping fields of view from different cameras and combining ("stitching") these images together in order to provide, for example, a two-dimensional projection for use with modern display devices. Legacy display applications often support a limited number of display projection formats, the most common of which being known as an equirectangular projection (ERP) format.

Incipient interest into different projection formats has sparked research into a number of possible intermediate projection formats. Examples of intermediate projection formats include without limitation e.g., equirectangular, cube map, equal-area cube map, octahedron, icosahedron, truncated square pyramid, fisheye (e.g., stereographic, equidistant, equisolid angle, orthographic, etc.), and segmented sphere projection. Additionally, the assignee hereof has developed an intermediate projection format known as a rotated sphere projection (RSP). It is known by the assignee hereof that many of these intermediate projection formats may have certain encoding advantages that are dependent upon, for example, the content (and/or the arrangement of this captured content) which may result in, for example, bitrate savings during transmission/reception of this encoded content. See, for example, U.S. patent application Ser. No. 15/466,559 filed Mar. 22, 2017 and entitled "Apparatus and Methods for Compressing Video Content using Adaptive Projection Selection" which claims the benefit of priority to U.S. Provisional Patent Application Ser. No. 62/397,274 of the same title filed on Sep. 20, 2016, the contents of which being incorporated herein by reference in its entirety.

While techniques exist that enable the encoding/decoding of, for example, panoramic content using these intermediate projection formats, many extant application eco-systems require (or only support) display projection formats such as the aforementioned ERP. Accordingly, the utility and advantages of these intermediate projection formats may be limited for use with, for example, these prior application eco-systems.

SUMMARY

The present disclosure satisfies the foregoing needs by providing, inter alia, methods and apparatus for the projection conversion decoding for use with ubiquitous application eco-systems, thereby enabling, for example, the encoding advantages (e.g., bitrate savings) associated with these intermediate projection formats.

In one aspect, a decoder apparatus is disclosed. In one embodiment, the decoder apparatus enables the conversion of an intermediate projection format to a display projection format. The decoder apparatus includes a processing apparatus, the processing apparatus configured to: read formatting information from an intermediate projection format; convert the intermediate projection format to a display projection format; apply a rotation operation to the display projection format in accordance with the read formatting information; and transmit the display projection format for use by an application.

In one variant, the processing apparatus is further configured to read information that identifies a type of intermediate projection format.

In another variant, the processing apparatus is further configured to identify that the type of intermediate projection format includes a rotated sphere projection.

In yet another variant, the processing apparatus is further configured to apply the rotation operation on a per-frame basis.

In yet another variant, the application of the rotation operation on the per-frame basis includes recovery of unstabilized imaging information for the intermediate projection format prior to the transmission of the display projection format for use by the application.

In yet another variant, the conversion of the intermediate projection format to the display projection format includes conversion of a rotated sphere projection to an equirectangular projection format.

In another aspect, a method for projection conversion decoding is disclosed. In one embodiment, the method includes reading formatting information from an intermediate projection; converting the intermediate projection to a display projection; applying a rotation operation to the display projection; and transmitting the display projection for use by an application.

In one variant, the reading of the formatting information includes reading information that identifies a type of intermediate projection format.

In another variant, the method further includes identifying that the type of intermediate projection format is a rotated sphere projection.

In yet another variant, the applying of the rotation operation includes applying the rotation operation on a per-frame basis.

In yet another variant, the applying of the rotation operation on the per-frame basis includes recovering unstabilized imaging information for the intermediate projection format prior to the transmitting of the display projection format for use by the application.

In yet another variant, the converting of the intermediate projection format to the display projection format includes converting a rotated sphere projection to an equirectangular projection format.

In yet another aspect, a computer-readable storage apparatus is disclosed. In one embodiment, the computer-readable storage apparatus includes a storage medium having a computer program stored thereon, the computer program including instructions, which when executed by a processor apparatus, performs the method including: reading formatting information from an intermediate projection; converting the intermediate projection to a display projection; applying a rotation operation to the display projection; and transmitting the display projection for use by an application.

In yet another aspect, an integrated circuit (IC) apparatus is disclosed. In one embodiment, the IC apparatus is configured to: read formatting information from an intermediate projection; convert the intermediate projection to a display projection; apply a rotation operation to the display projection; and transmit the display projection for use by an application.

In yet another aspect, a computing device is disclosed. In one embodiment, the computing device includes a signal generation device, the signal generation device configured to capture a plurality of frames of video data; a processing unit configured to process the plurality of frames of the video data; and a non-transitory computer-readable storage apparatus, the computer-readable storage apparatus including a storage medium having computer-readable instructions, the computer-readable instructions being configured to, when executed by the processing unit: read formatting information from an intermediate projection; convert the intermediate projection to a display projection; apply a rotation operation to the display projection; and transmit the display projection for use by an application.

In another embodiment, the non-transitory computer-readable storage apparatus may be obviated in favor of an IC apparatus, such as the aforementioned IC apparatus described supra.

In yet another embodiment, the computing system includes a network interface, the network interface configured to receive imaging data in an intermediate projection format; a non-transitory computer readable apparatus, the non-transitory computer readable apparatus configured to store the imaging data in the intermediate projection format; and a processing apparatus, the processing apparatus configured to: retrieve the imaging data in the intermediate projection format from the non-transitory computer readable apparatus; read formatting information from the intermediate projection format; convert the intermediate projection format to a display projection format; apply a rotation operation to the display projection format in accordance with the read formatting information; and transmit the display projection format for use by an application.

In one variant, the computing device further includes a display and the processing apparatus is further configured to display the display projection format.

In another variant, the computing system includes a portable communications device.

In yet another variant, the processing apparatus is further configured to read information that identifies a type of intermediate projection format.

In yet another variant, the processing apparatus is further configured to identify that the type of intermediate projection format includes a rotated sphere projection.

In yet another variant, the processing apparatus is further configured to apply the rotation operation on a per-frame basis.

In yet another variant, the application of the rotation operation on the per-frame basis includes recovery of unstabilized imaging information for the intermediate projection format prior to the transmission of the display projection format for use by the application.

In yet another variant, the conversion of the intermediate projection format to the display projection format includes conversion of a rotated sphere projection to an equirectangular projection format.

In yet another aspect, an image processing system is disclosed. In one embodiment, the image processing system includes a projection format conversion module, an encoder apparatus, and a decoder apparatus, the decoder apparatus configured to output a display projection format to an application eco-system. In a variant, the decoder apparatus enables the conversion of an intermediate projection format to a display projection format.

Other features and advantages of the present disclosure will immediately be recognized by persons of ordinary skill in the art with reference to the attached drawings and detailed description of exemplary implementations as given below.

All Figures disclosed herein are © Copyright 2018-2018 GoPro, Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while implementations described herein are primarily discussed in the context of so-called Rotated Sphere Projections (RSP) such as that described in co-owned and co-pending U.S. patent application Ser. No. 15/665,202 filed Jul. 31, 2017 and entitled "Methods and Apparatus for Providing a Frame Packing Arrangement for Panoramic Content", which claims the benefit of priority to U.S. Provisional Patent Application Ser. No. 62/477,936 filed Mar. 28, 2017 of the same title; U.S. Provisional Patent Application Ser. No. 62/473,952 filed Mar. 20, 2017 of the same title; U.S. Provisional Patent Application Ser. No. 62/465,678 filed Mar. 1, 2017 of the same title; U.S. Provisional Patent Application Ser. No. 62/462,804 filed Feb. 23, 2017 of the same title; and U.S. Provisional Patent Application Ser. No. 62/446,297 filed Jan. 13, 2017 and entitled "Methods and Apparatus for Rotated Sphere Projections", the contents of each of the foregoing incorporated supra, it is readily appreciated that the principles described herein can be equally applied to other intermediate projection formats such as, for example, equal area cubemap (EAC) projections, segmented sphere projection (SSP) formats and/or other intermediate projection formats.

These and other variations would be readily apparent to one of ordinary skill given the contents of the present disclosure.

Image Processing System—

Figure 1:
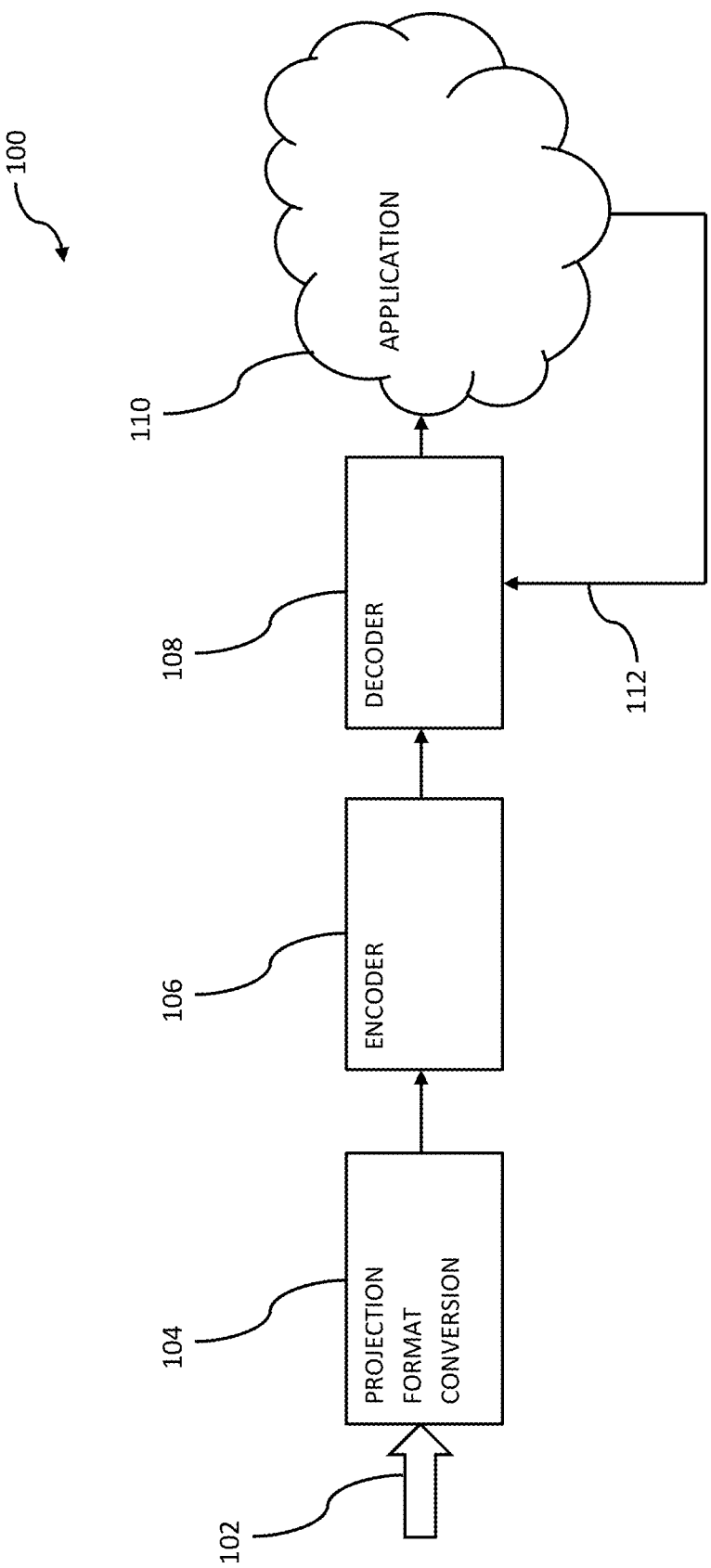
FIG. 1 is an exemplary block diagram of an image processing system, useful in describing the principles of the present disclosure.
Figure 3:
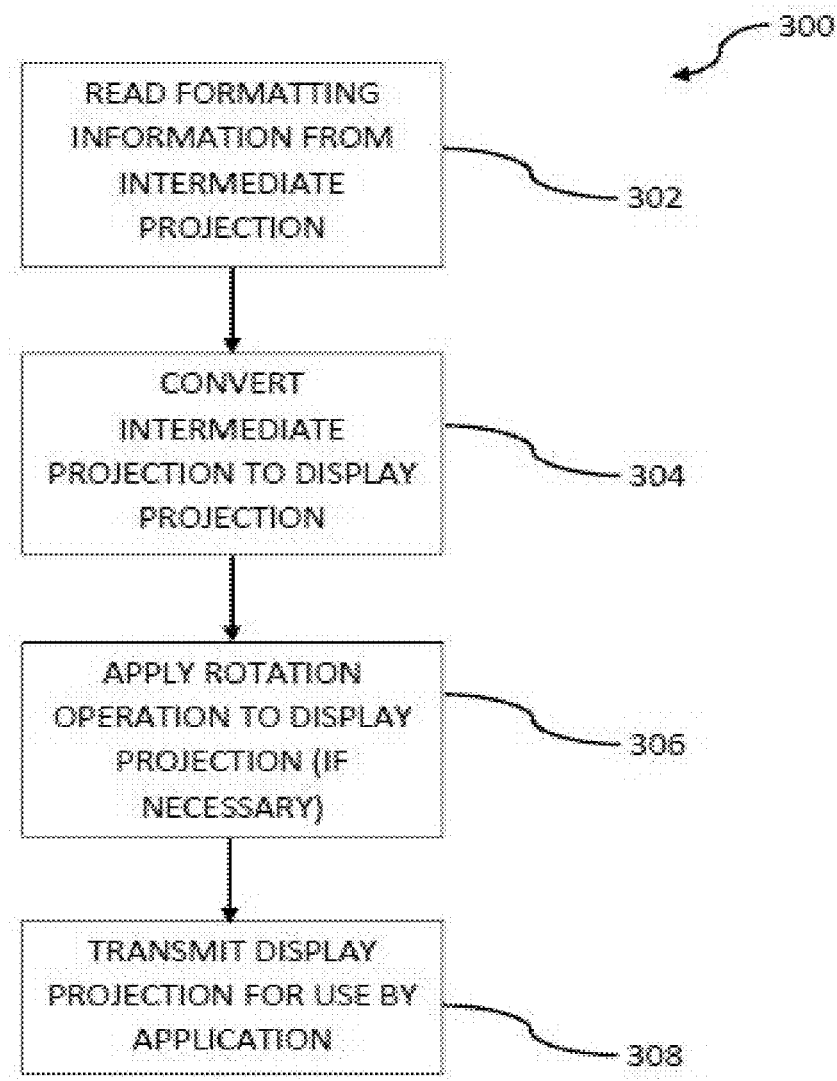
FIG. 3 is a logical flow diagram illustrating an exemplary embodiment for the conversion of intermediate projection formats into display projection formats, useful in describing the principles of the present disclosure.
Figure 4:
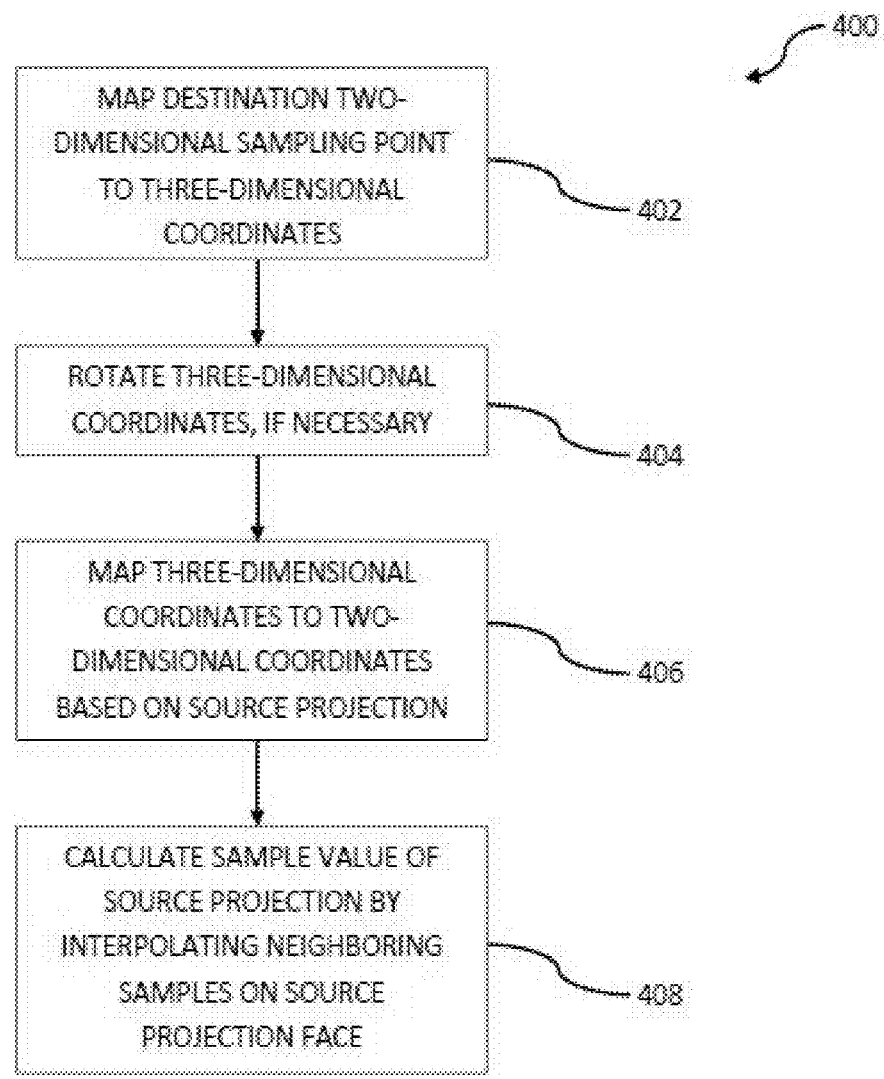
FIG. 4 is a logical flow diagram illustrating an exemplary embodiment for the conversion of a source projection format into a destination projection format, useful in describing the principles of the present disclosure.

FIG. 1 illustrates an exemplary image processing system 100 for use in, for example, performing the methodology described infra with reference to FIGS. 3 and 4. The image processing system may include a projection format conversion apparatus 104 which takes an input 102 and outputs a converted format projection (e.g., an intermediate projection format) to an encoder apparatus 106. In some implementations, this input 102 may include a display projection format. As used herein, the term "display projection format" refers to a projection format which may be readily utilized by, for example, many common application eco-systems such as application eco-system 110. Additionally (or alternatively), display projection format may also refer to a projection that is simpler to describe (but may be inefficient for the purposes of compression). For example, one such known display projection format includes an ERP format. In some implementations, this input 102 may include an intermediate projection format and the projection format conversion apparatus 104 may convert this intermediate projection format and convert it to another differing intermediate projection format. As used herein, the term "intermediate projection format" includes a projection format that is not supported by, for example, many common application eco-systems. For example, projections such as RSP, EAC, Fisheye (e.g., stereographic, equidistant, equisolid angle, orthographic, etc.) and SSP may consist of intermediate projection formats. The input 102 may also include a spherical projection in some implementations. The projection format conversion apparatus 104 may additionally apply a rotation operation during projection conversion in order to, inter alia, improve upon coding efficiency (e.g., optimize and/or reduce bitrate).

As described elsewhere herein, intermediate projection formats may have encoding efficiencies associated with them that may be dependent upon, for example, the content contained within the projection. See, for example, U.S. patent application Ser. No. 15/466,559 filed Mar. 22, 2017 and entitled "Apparatus and Methods for Compressing Video Content using Adaptive Projection Selection" which claims the benefit of priority to U.S. Provisional Patent Application Ser. No. 62/397,274 of the same title filed on Sep. 20, 2016, the contents of which being incorporated supra.

The encoder apparatus 106 may be configured to encode one or more intermediate projection formats received from the projection format conversion apparatus 104 for transmission over, for example, a network to a decoder apparatus 108. In some implementations, the encoder apparatus 106 may be configured to encode a plurality of different types of intermediate projection formats. In some implementations, the encoder apparatus 106 may encode metadata information associated with the intermediate projection format. This metadata information may include, for example, information that enables decoder apparatus 108 to properly decode the intermediate projection format. For example, if a rotation is applied during projection format conversion by the projection format conversion apparatus 104, this applied rotation information may be included. Additionally, the type of the intermediate projection format may be included within this aforementioned metadata. The information contained within this metadata may be added by the encoder apparatus 106, may be added by the projection format conversion apparatus 104, or may be added by a combination of the foregoing.

Metadata information, and the content contained therein, is described in co-owned and co-pending U.S. patent application Ser. No. 15/665,202 filed Jul. 31, 2017 and entitled "Methods and Apparatus for Providing a Frame Packing Arrangement for Panoramic Content", which claims the benefit of priority to U.S. Provisional Patent Application Ser. No. 62/477,936 filed Mar. 28, 2017 of the same title; U.S. Provisional Patent Application Ser. No. 62/473,952 filed Mar. 20, 2017 of the same title; U.S. Provisional Patent Application Ser. No. 62/465,678 filed Mar. 1, 2017 of the same title; U.S. Provisional Patent Application Ser. No. 62/462,804 filed Feb. 23, 2017 of the same title; and U.S. Provisional Patent Application Ser. No. 62/446,297 filed Jan. 13, 2017 and entitled "Methods and Apparatus for Rotated Sphere Projections", the contents of each of the foregoing incorporated supra. Additionally, this metadata information may include additional information such as that described in co-owned and co-pending U.S. patent application Ser. No. 15/406,175 filed Jan. 13, 2017 entitled "Apparatus and Methods for the Storage of Overlapping Regions of Imaging Data for the Generation of Optimized Stitched Images", the contents of which being incorporated herein by reference in its entirety. For example, the metadata information may include data from internal gyroscopes and/or accelerometers located within an image capture device. This data may be used for, for example, image stabilization for the captured content which enables image stabilization to occur at the encoder apparatus 106 and/or the decoder apparatus 108. For example, image stabilization may improve upon the encoding efficiency for the intermediate projection format. For an unstabilized intermediate projection format, the compression efficiency may be poor due to the random appearing motion that may resultant from, for example, camera shake. Accordingly, by using this metadata information to apply per-frame rotations prior to encoding, the encoder apparatus 106 may compress the image data much more efficiently. The applied rotations, prior to encoding, may be stored as metadata information for use by the decoder apparatus 108 so as to enable, for example, the acquisition of the original unstabilized image data at the time of decode.

The decoder apparatus 108 is configured to decode the received intermediate projection format and convert this received intermediate projection format to a display projection format. The underlying mathematical operations to be performed for this decoder projection format conversion is contained within Appendix I which forms part of this disclosure. Using the decoder apparatus 108 to not only decode the received intermediate projection format, but to also convert this intermediate projection format to a display projection format offers significant improvement over prior art solutions. For example, using decoder apparatus 108 to perform this projection conversion enables decoder apparatus 108 to perform this conversion using physical hardware (as opposed to requiring, for example, that application eco-system perform this conversion via the use of a software solution). One such advantage of the exemplary image processing system 100 of FIG. 1 is that it enables the introduction of a variety of intermedia projection formats (including the aforementioned RSP, EAC, Fisheye (e.g., stereographic, equidistant, equisolid angle, orthographic, etc.) and SSP, etc.) without the wider ecosystem impacts that are resultant from the introduction of new intermediate projection formats. In other words, the exemplary image processing system 100 may only require the decoder apparatus 108 to require knowledge of the intermediate projection format (e.g., RSP).

In some implementations, the decoder apparatus 108 may read the metadata information contained within the intermediate projection format in order to properly decode the intermediate projection format prior to conversion. For example, decoder apparatus 108 may read information with regards to rotation operations performed by projection format conversion apparatus 104 and/or encoder apparatus 106. As discussed elsewhere herein, application 110 may only be capable of displaying a display projection format image. However, in some implementations, application 110 may be configured to convert the intermediate projection format into a display projection format (as part of the normative decoding process) prior to display on, for example, a display device. In such implementations, the application 110 may decide that its conversion application may be more efficiently handled by decoder apparatus 108. Accordingly, application 110 may signal to decoder apparatus 108 to decode the intermediate projection format to a display projection format via signaling path 112. For example, in such a scenario, decoder apparatus 108 may be utilized as a hardware accelerator for application 110. In other implementations, the decoder apparatus 108 may perform its decode operations using software in combination with hardware, as opposed to the aforementioned hardware-specific variants.

One or more of projection format conversion apparatus 104, encoder apparatus 106, decoder apparatus 108, and application 110 may be embodied as a computing system. For example, decoder apparatus 108 and application 110 may be implemented within a distinct computing system from another computing system that includes, for example, the projection format conversion apparatus 104 and the encoder apparatus 106.

The computing system may be used to execute instructions (e.g., program code or software) for causing the computing system to perform any one or more (or portions) of the methodologies (or processes) described subsequently herein. The computing system may also be used to perform any one or more (or portions) of the methodologies (or processes) described subsequently herein via the use of one or more integrated circuits. In some implementations, the computing system operates as a standalone device or a connected (e.g., networked) device that connects to other computer systems. The computing system may include, for example, an action camera (e.g., a camera capable of capturing, for example, a 360° FOV), a personal computer (PC), a tablet PC, a notebook computer, and/or other device capable of executing instructions (sequential or otherwise) that specify actions to be taken. In another embodiment, the computing system may include a server. In a networked deployment, the computing system may operate in the capacity of a server or client in a server-client network environment, or as a peer device in a peer-to-peer (or distributed) network environment. A plurality of computing systems may also operate to, for example, jointly execute instructions to perform any one or more of the encoding/decoding methodologies discussed herein.

Figure 2:
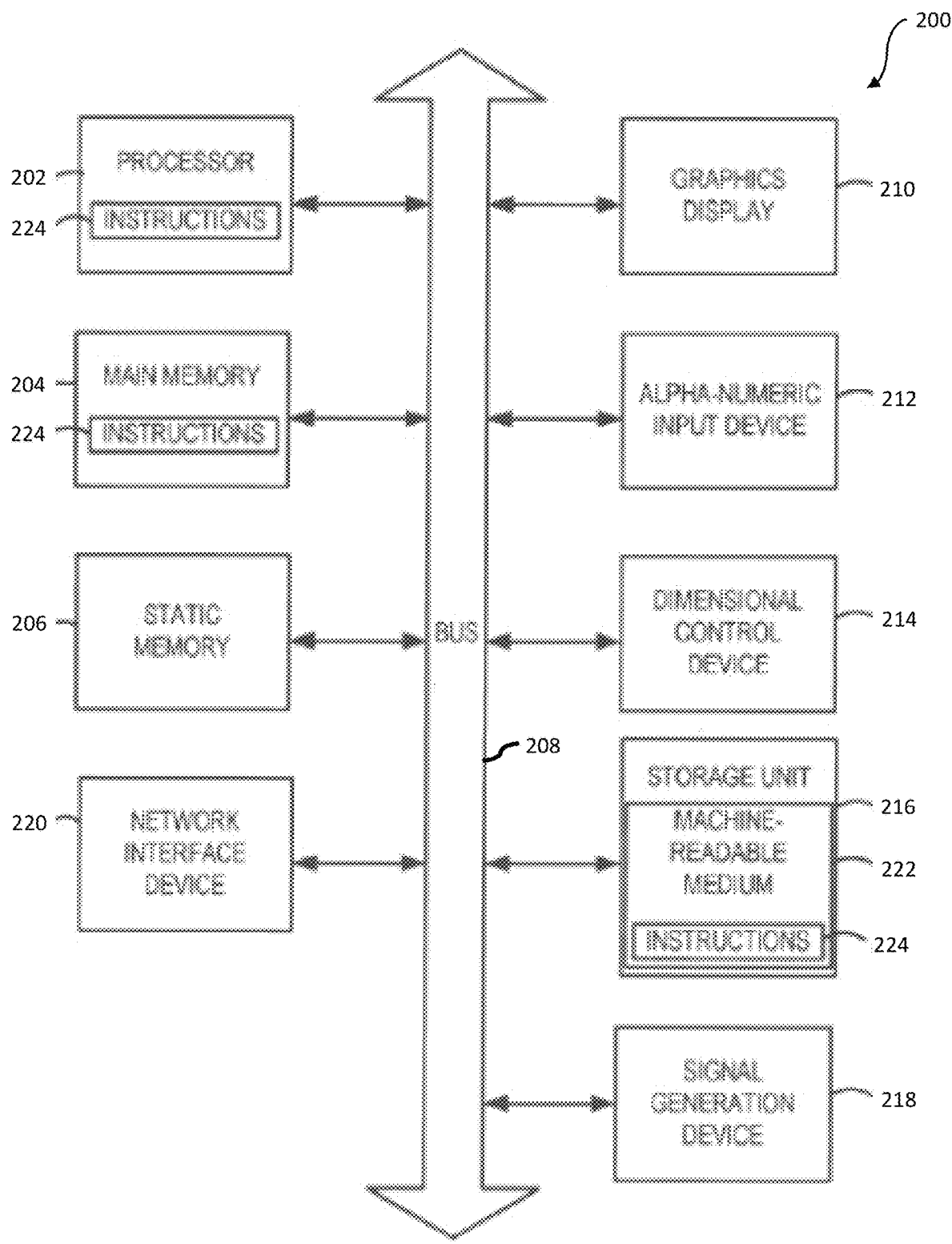
FIG. 2 is a block diagram of an exemplary implementation of a computing system, useful in performing, for example, the methodologies (either partially or as a whole) described elsewhere herein, in accordance with the principles of the present disclosure.

FIG. 2 is a block diagram illustrating components of an example computing system (or computing device) 200 able to read instructions from a computer-readable medium and execute them in one or more processors (or controllers). The computing system in FIG. 2 may represent an implementation of, for example, an image/video processing device for the purpose of implementing the methodologies (or portions thereof) described elsewhere herein. In some implementations, the computing system 200 may include, for example, one or more image capture devices.

The computing system 200 can be used to execute instructions 224 (e.g., program code or software) for causing the computing system 200 to perform any one or more of the methodologies (or portions thereof) described elsewhere herein. In alternative embodiments, the computing system 200 operates as a standalone device or a connected (e.g., networked) device that connects to other computer systems. The computing system 200 may include, for example, an action camera (e.g., a camera capable of capturing, for example, a 360° FOV), a personal computer (PC), a tablet PC, a notebook computer, or other device capable of executing instructions 224 (sequential or otherwise) that specify actions to be taken. In another embodiment, the computing system 200 may include a server. In a networked deployment, the computing system 200 may operate in the capacity of a server or client in a server-client network environment, or as a peer device in a peer-to-peer (or distributed) network environment. Further, while only a single computer system 200 is illustrated, a plurality of computing systems 200 may operate to jointly execute instructions 224 to perform any one or more of the methodologies (or portions thereof) discussed herein.

The example computing system 200 includes one or more processing units (generally processor apparatus 202). The processor apparatus 202 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 200 may include a main memory 204. The computing system 200 may include a storage unit 216. The processor 202, memory 204 and the storage unit 216 may communicate via a bus 208.

In addition, the computing system 200 may include a static memory 206 and a display driver 210 (e.g., to drive a plasma display panel (PDP), a liquid crystal display (LCD), a projector, or other types of displays). The computing system 200 may also include input/output devices, for example, an alphanumeric input device 212 (e.g., touch screen-based keypad or an external input device such as a keyboard), a dimensional (e.g., 2-D or 3-D) control device 214 (e.g., a touch screen or external input device such as a mouse, a trackball, a joystick, a motion sensor, or other pointing instrument), a signal capture/generation device 218 (e.g., a speaker, camera, GPS sensor, accelerometers, gyroscopes and/or microphone), and a network interface device 220, which also are configured to communicate via the bus 208.

Embodiments of the computing system 200 corresponding to a client device may include a different configuration than an embodiment of the computing system 200 corresponding to a server. For example, an embodiment corresponding to a server may include a larger storage unit 216, more memory 204, and a faster processor 202 but may lack the display driver 210, input device 212, and dimensional control device 214. An embodiment corresponding to an action camera may include a smaller storage unit 216, less memory 204, and a power efficient (and slower) processor 202 and may include multiple image capture devices 218 (e.g., to capture 360° FOV images or video).

The storage unit 216 includes a computer-readable medium 222 on which is stored instructions 224 (e.g., a computer program or software) embodying any one or more of the methodologies or functions described herein. The instructions 224 may also reside, completely or at least partially, within the main memory 204 or within the processor 202 (e.g., within a processor's cache memory) during execution thereof by the computing system 200, the main memory 204 and the processor 202 also constituting computer-readable media. The instructions 224 may be transmitted or received over a network via the network interface device 220.

While computer-readable medium 222 is shown in an example embodiment to be a single medium, the term "computer-readable medium" should be taken to include a single medium or multiple media (e.g., a centralized or distributed database, or associated caches and servers) able to store the instructions 224. The term "computer-readable medium" shall also be taken to include any medium that is capable of storing instructions 224 for execution by the computing system 200 and that cause the computing system 200 to perform, for example, one or more of the methodologies (or portions thereof) disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, for example, different memories in a system.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

As used herein, the term "computing device", includes, but is not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "network interface" refers to any signal, data, and/or software interface with a component, network, and/or process. By way of non-limiting example, a network interface may include one or more of FireWire (e.g., FW400, FW110, and/or other variation), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the terms "processing unit" or "processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

Exemplary Methodologies

FIG. 3 is a logical flow diagram illustrating exemplary methodology 300 for the conversion of intermediate projection formats into display projection formats. At operation 302, a decoder apparatus 108 may read formatting information from a received intermediate projection. For example, the received intermediate projection may include information such as (i) the type of intermediate projection format utilized; and (ii) rotation operation information that may be utilized by the decoder apparatus 108 in order to output a display projection format such as the aforementioned ERP. This formatting information may be contained within metadata information as described supra in some implementations. For example, this read formatting information may indicate that the intermediate projection format is a fisheye projection (e.g., a stereographic fisheye projection). In some implementations, the fisheye projection may need to be converted into a spherical coordinate system (x, y, z) prior to being converted into another intermediate projection or into a destination projection as is described with reference to, for example, FIG. 4 discussed infra. A fisheye projection may be characterized by the lens' mathematics in some implementations. For example, the shape of the lens (or set of lens') may be characterized by a polynomial equation that governs the mapping of the fisheye projection into a spherical coordinate system.

At operation 304, the decoder apparatus 108 may convert the intermediate projection format to a display projection format in accordance with the read formatting information. For example, when mapping a stereographic fisheye projection (e.g., an intermediate projection) to a destination projection (e.g., ERP), the mathematics and its inverse may be governed by equations (1) and (2) below:

$$(X,Y)=(x/(1-z), y/(1-z)) \quad \text{(Eqn. 1)}$$

$$(x,y,z)=(2X/(1+X^2+Y^2), 2Y/(1+X^2+Y^2), (-1+X^2+Y^2)/(1+X^2+Y^2)) \quad \text{(Eqn. 2)}$$

At operation 306, the decoder apparatus 108 may apply a rotation operation to the display projection format prior to outputting the display format projection to a display device. For example, this applied rotation operation may be performed on a per frame basis. This per frame basis applied rotation operation may take into consideration metadata information such as accelerometer and/or gyroscopic data that was captured at the time of image capture. Accordingly, the applied rotation operation may be utilized for the purpose of providing image stabilization for the captured content at the time of, for example, decode. In some implementations, the image data may have been image-stabilized prior to the encoding of the intermediate projection format in order to, inter alia, improve upon the encoding efficiency as described elsewhere herein. Accordingly, the applied rotation at operation 306 may enable the recovery of the original unstabilized frames, which may be desirable to an end user in some implementations. The decoder apparatus 108 may also read the formatting information to determine the type of intermediate projection format utilized. At operation 308, the display projection format generated by the decoder apparatus 108 may be transmitted for use by, for example, application 110. In some implementations, application 110 may request the display projection format from the decoder apparatus 108 prior to the transmitting operation 308.

FIG. 4 is a logical flow diagram illustrating an exemplary methodology 400 for the conversion of a source projection format (e.g., an intermediate projection format) into a destination projection format (e.g., another intermediate projection format or a display projection format). In some implementations, a given projection format may be stored (e.g., in storage unit 216, FIG. 2) face by face. For example, consider the aforementioned cube map or equal-area cube map projections. Both of these projection formats include six (6) faces (i.e., top, bottom, front, back, left, right). Accordingly, for a cube map or equal-area cube map projection, the coordinates for the projection may be stored in respective ones of these six (6) faces. As but another non-limiting example, consider an octahedron projection format. An octahedron projection format may include eight (8) faces and accordingly, the coordinates for the projection may be stored in respective ones of these eight (8) faces. As but another non-limiting example, consider a fisheye projection that utilizes a stereographic projection. Such a projection may include (2) faces (e.g., front camera and back camera) and accordingly, the coordinates may be stored in respective ones of these two (2) faces. It would be readily apparent to one of ordinary skill given the contents of the present disclosure (including Appendix I), how these coordinates may be stored given other projection format types.

As a brief aside, the following nomenclature will be described for the purposes of illustration and for ease of understanding, although it would be readily apparent to one of ordinary skill that deviations from the following nomenclature would be readily apparent to one of ordinary skill given the contents of the present disclosure. For example, in a destination projection format one may denote $(f_d, m_d, n_d)$ as a point $(m_d, n_d)$ on face $f_d$, and in a source projection format one may denote $(f_s, m_s, n_s)$ as a point $(m_s, n_s)$ on face $f_s$. In the present illustration, the subscripts 'd' and 's' represent the coordinates in the destination and source projection formats, respectively. Additionally, one may denote coordinates (X, Y, Z) as the corresponding coordinates in the three-dimensional XYZ space. Accordingly, the conversion process may take into consideration each sample position $(f_d, m_d, n_d)$ on the destination projection plane, map this coordinate to a corresponding coordinate (X, Y, Z) in a three-dimensional coordinate system, finds the corresponding coordinate position $(f_s, m_s, n_s)$ on the source projection plane, and sets the sample value at $(f_d, m_d, n_d)$ based on the sample value at $(f_s, m_s, n_s)$. Additionally, instead of mandating the XYZ axes of the source and destination projections to be aligned, a set of three-dimensional rotation parameters (e.g., yaw, pitch, roll) may be used to specify the relative rotation between the source and destination three-dimensional coordinates, where, for example, yaw specifies the counterclockwise rotation in degrees along the Y axis, pitch specifies the counterclockwise rotation in degrees along −Z axis, and roll specifies the counterclockwise rotation in degrees along the X axis.

Figure 5:
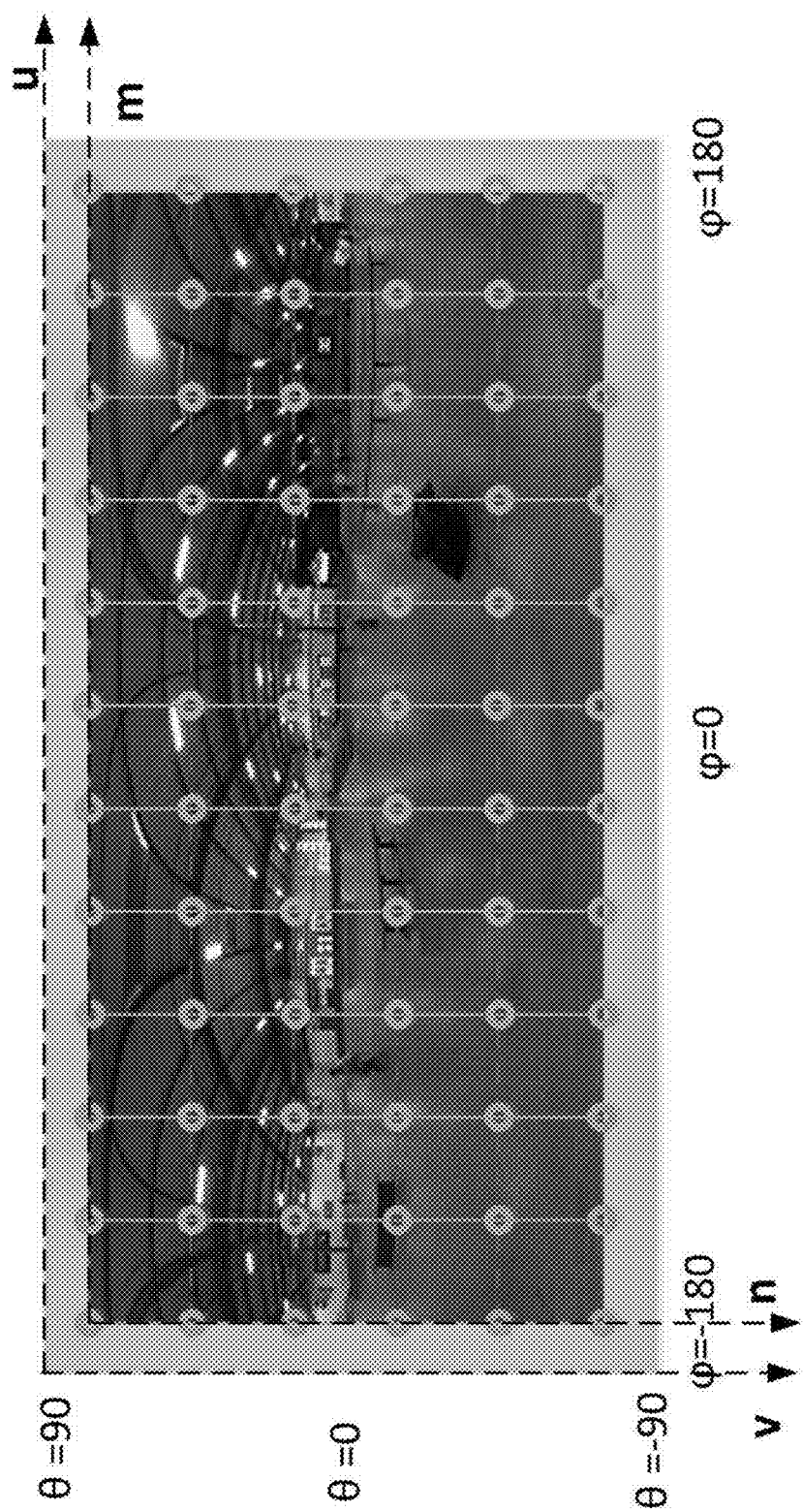
FIG. 5 is a plot illustrating the sampling coordinates defined in the uv plane for an equirectangular projection, useful in describing the principles of the present disclosure.

Referring back to FIG. 4, and at operation 402, a two-dimensional coordinate (or sampling point) for the destination projection format may be mapped to a three-dimensional coordinate. For example, consider an ERP projection format as the destination projection format. The ERP projection format is widely used to display, for example, panoramic images onto a two-dimensional display device. The ERP projection format may typically only have a single face, and therefore the face index for an ERP projection format may be set at an arbitrary value (e.g., the value '0'). When viewing an exemplary scene (such as the scene depicted in FIG. 5), the two-dimensional to three-dimensional mapping may occur as follows. For a given sampling position (m, n), a given position in a 'uv' plane may be calculated using equations (3) and (4) below:

$$u=(m+0.5)/W, \; 0 \leq m < W \quad \text{(Eqn. 3)}$$

$$v=(n+0.5)/H, \; 0 \leq n < H \quad \text{(Eqn. 4)}$$

The longitudinal and latitudinal coordinates ($\Phi$, $\theta$) in the three-dimensional coordinate system may then be calculated using the values 'u' and 'v' using equations (5) and (6) below:

$$\phi=(u-0.5)*(2*\pi) \quad \text{(Eqn. 5)}$$

$$\theta=(0.5-v)*\pi \quad \text{(Eqn. 6)}$$

Subsequent to the obtainment of the values '$\Phi$' and '$\theta$', the three dimensional values (X, Y, Z) may be obtained using Equations (7), (8), and (9) below:

$$X=\cos(\theta)\cos(\phi) \quad \text{(Eqn. 7)}$$

$$Y=\sin(\theta) \quad \text{(Eqn. 8)}$$

$$Z=-\cos(\theta)\sin(\phi) \quad \text{(Eqn. 9)}$$

While the mapping of the ERP projection from a two-dimensional sampling point to three-dimensional coordinates at operation 402 has been shown and described in detail, it would be readily apparent to one of ordinary skill given the contents of the present disclosure (e.g., Appendix I), how the same mapping may occur using other destination projection formats.

At operation 404, the three-dimensional coordinates obtained at operation 402 may be rotated, if necessary. For example, and in the context of the exemplary yaw, pitch and roll coordinates described previously supra, the rotation may be accomplished using equations (10), (11) and (12) below:

$$R_Z(\text{pitch}) = \begin{vmatrix} \cos(\text{pitch}) & -\sin(\text{pitch}) & 0 \\ \sin(\text{pitch}) & \cos(\text{pitch}) & 0 \\ 0 & 0 & 1 \end{vmatrix} \quad \text{(Eqn. 10)}$$

$$R_Y(\text{yaw}) = \begin{bmatrix} \cos(\text{yaw}) & 0 & \sin(\text{yaw}) \\ 0 & 1 & 0 \\ -\sin(\text{yaw}) & 0 & \cos(\text{yaw}) \end{bmatrix} \quad \text{(Eqn. 11)}$$

$$R_X(\text{roll}) = \begin{bmatrix} 1 & 0 & 0 \\ 0 & \cos(\text{roll}) & -\sin(\text{roll}) \\ 0 & \sin(\text{roll}) & \cos(\text{roll}) \end{bmatrix} \quad \text{(Eqn. 12)}$$

For example, this applied rotation operation may be performed on a per frame basis. This per frame basis applied rotation operation may take into consideration metadata information such as accelerometer and/or gyroscopic data that was captured at the time of image capture. Accordingly, the applied rotation operation may be utilized for the purpose of providing image stabilization for the captured content at the time of, for example, decode. In some implementations, the image data may have been image-stabilized prior to the encoding of the intermediate projection format in order to, inter alia, improve upon the encoding efficiency as described elsewhere herein. Accordingly, the applied rotation at operation 406 may enable the recovery of the original unstabilized frames, which may be desirable to an end user in some implementations.

At operation 406, the three-dimensional coordinates obtained at operation 402 or operation 404 are mapped to two-dimensional coordinates based on the source projection format. For example, consider a cubemap projection as the source projection format. In the cubemap projection, given a three-dimensional coordinate position (X, Y, Z) (e.g., as derived at operations 402 and 404), the two-dimensional cubemap projection coordinates (m, n) are derived by utilizing equations (13) and (14) as set forth below, with the values (u, v) and face index 'f' being determined according to Table 1 below:

TABLE 1

Derivation of (u, v) and the face index f given (X, Y, Z)

| Condition | f | u | v |
|---|---|---|---|
| \|X\| ≥ \|Y\| and \|X\| ≥ \|Z\| and X > 0 | 0 | −Z/\|X\| | −Y/\|X\| |
| \|X\| ≥ \|Y\| and \|X\| ≥ \|Z\| and X < 0 | 1 | Z/\|X\| | −Y/\|X\| |
| \|Y\| ≥ \|X\| and \|Y\| ≥ \|Z\| and Y > 0 | 2 | X/\|Y\| | Z/\|Y\| |
| \|Y\| ≥ \|X\| and \|Y\| ≥ \|Z\| and Y < 0 | 3 | X/\|Y\| | −Z/\|Y\| |
| \|Z\| ≥ \|X\| and \|Z\| ≥ \|X\| and Z > 0 | 4 | X/\|Z\| | −Y/\|Z\| |
| \|Z\| ≥ \|X\| and \|Z\| ≥ \|Y\| and Z < 0 | 5 | −X/\|Z\| | −Y/\|Z\| |

$$u=(m+0.5)*2/A-1, 0 \leq m < A \quad \text{(Eqn. 13)}$$

$$v=(n+0.5)*2/A-1, 0 \leq n < A \quad \text{(Eqn. 14)}$$

Note that in the illustrated example, the value 'A' is denoted by any square face (or facet within the cubemap projection) having a dimension A×A.

Figure 6:
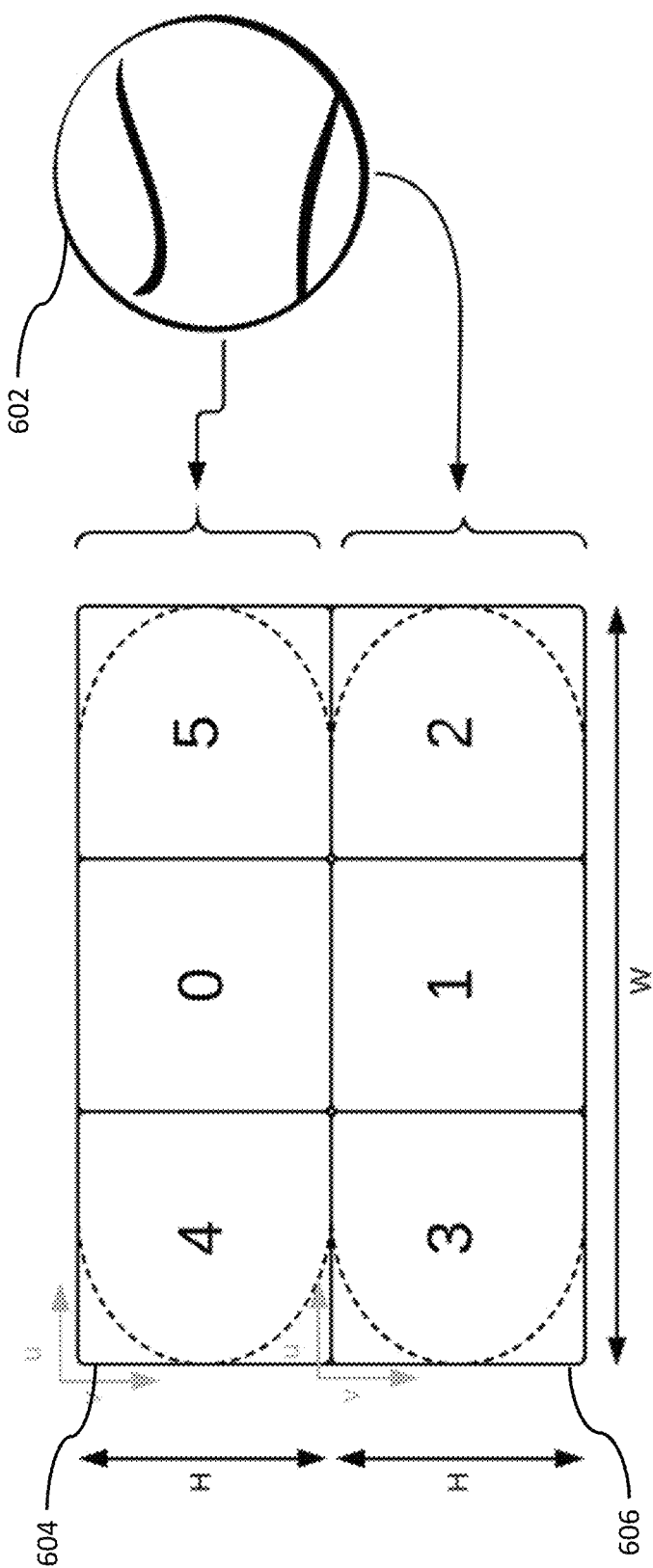
FIG. 6 illustrates rotated sphere projection conversion from spherical coordinates to a horizontal frame packing arrangement, useful in describing the principles of the present disclosure.

As but another non-limiting example, consider the source projection format to be RSP. As a brief aside, RSP may partition the spherical captured image 602 into two equal-sized segments 604, 606 and places them onto a two-dimensional projection plane in two rows as is shown in FIG. 6. The properties of RSP are described in co-owned U.S. patent application Ser. No. 15/665,202 filed Jul. 31, 2017 and entitled "Methods and Apparatus for Providing a Frame Packing Arrangement for Panoramic Content", which claims the benefit of priority to U.S. Provisional Patent Application Ser. No. 62/477,936 filed Mar. 28, 2017 of the same title; U.S. Provisional Patent Application Ser. No. 62/473,952 filed Mar. 20, 2017 of the same title; U.S. Provisional Patent Application Ser. No. 62/465,678 filed Mar. 1, 2017 of the same title; U.S. Provisional Patent Application Ser. No. 62/462,804 filed Feb. 23, 2017 of the same title; and U.S. Provisional Patent Application Ser. No. 62/446,297 filed Jan. 13, 2017 and entitled "Methods and Apparatus for Rotated Sphere Projections", each of the foregoing being incorporated herein by reference in its entirety.

Referring back to FIG. 6, face 4, face 0, and face 5 represent a so-called top segment 604 with the samples on these faces being derived using ERP as is described elsewhere herein. Face 3, face 1 and face 2 represent a so-called bottom segment 606 with the samples on these faces being derived using ERP, subject to a rotation operation. This rotation operation is characterized by a 180° rotation along the Y-axis (i.e., to bring the back side to the front) and a 90° rotation along the X-axis (i.e., to bring the poles of the spherical captured image 602 to the equator). In other words, let (X', Y', Z') be the three-dimensional coordinates on the sphere after performing the aforementioned rotation to the three-dimensional coordinates (X, Y, Z). This rotation is governed by equations (15), (16) and (17) below:

$$X'=-X \quad \text{(Eqn. 15)}$$

$$Y'=-Z \quad \text{(Eqn. 16)}$$

$$Z'=-Y \quad \text{(Eqn. 17)}$$

In order to map the three-dimensional coordinates to two-dimensional coordinates based on the RSP projection (i.e., operation 406), a point (m, n) of the top segment 604 can be expressed in terms of ($\Phi$, $\theta$) in accordance with equations (18) and (19) below:

$$m = W\left(\frac{2\phi}{3\pi} + 0.5\right) - 0.5 \quad \text{(Eqn. 18)}$$

$$n = H\left(-\frac{2\theta}{\pi} + 0.5\right) - 0.5 \quad \text{(Eqn. 19)}$$

The bottom segment 606 may be derived similarly, however the terms ($\Phi$, $\theta$) will now be replaced in equations (18) and (19) with the terms ($\Phi'$, $\theta'$). The terms ($\Phi'$, $\theta'$) are derived based on equations (20) and (21) as illustrated below:

$$\theta' = \sin^{-1}(\cos\theta \sin\phi) \quad \text{(Eqn. 20)}$$

$$\phi' = \tan^{-1}\frac{\tan\theta}{-\cos\phi} \quad \text{(Eqn. 21)}$$

Accordingly, given a three-dimensional coordinate (X, Y, Z), the face index f' is determined in the same way as the cubic map projection described elsewhere herein in accordance with Table 1 supra. If the initial face index value f' is equal to a value of '0' or '1', then the initial face index value f' is set to equal face index value f. Otherwise, if the initial face index f' is any of values '2', '3', '4', or '5', then the final face index f is set by adjusting f' according to the conditions listed in Table 2 below:

TABLE 2

Face index update in RSP

| Initial index f' | Condition | Final index f |
|---|---|---|
| f' = 2 or 3 | X > 0 and \|\|(X, Y, Z) − P\|\| > T, where P = (0, 1, 0) if f' = 2 P = (0, −1, 0) if f' = 3 | $f = 0$ if $-\frac{\pi}{4} < \phi < \frac{\pi}{4}$ $f = 4$ if $\phi < -\frac{\pi}{4}$ $f = 5$ if $\frac{\pi}{4} < \phi$ |
| f' = 4 or 5 | X < 0 and \|\|(X, Y, Z) − P\|\| > T, where P = (0, 0, 1) if f' = 4 P = (0, 0, −1) if f' = 5 | $f = 1$ if $\theta < 0$ and $\phi' \geq -\frac{\pi}{4}$ or $\theta > 0$ and $\phi' \leq \frac{\pi}{4}$ $f = 2$ if $\theta > 0$ and $\phi' > \frac{\pi}{4}$ $f = 3$ if $\theta < 0$ and $\phi' < -\frac{\pi}{4}$ |

In Table 2 above, the value of T may be set to a pre-determined constant (e.g., 0.59). If the condition in the 'condition' column above is 'true', then the adjustment in the 'final index f' is performed. Otherwise, f is set to f' directly. The face index update discussed above with respect to Table 2 is performed as their may be inactive regions as is described in additional detail in, for example, co-owned U.S. patent application Ser. No. 15/665,202 filed Jul. 31, 2017 and entitled "Methods and Apparatus for Providing a Frame Packing Arrangement for Panoramic Content", the contents of which being incorporated herein by reference in its entirety. These and other variants would be readily apparent to one of ordinary skill given the contents of Appendix I included within the present application.

At operation 408, the sample value of the source projection is calculated by interpolating neighboring samples on the source projection face. For example, consider a sample value located at position ($f_s$, $m_s$, $n_s$) within the source projection format. The sample value ($f_s$, $m_s$, $n_s$) is then place interpolated from neighboring samples at integer positions on face $f_s$. This interpolated sample value may then be placed at ($f_d$, $m_d$, $n_d$) in the destination projection format. The interpolation filters utilized may include those included in Appendix I of the present application.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. An image processing system comprising:
   a processor apparatus;
   an encoder apparatus;
   a decoder apparatus;
   a display apparatus; and
   a computer-readable apparatus in data communication with the processor apparatus and comprising a storage medium, the storage medium comprising a plurality of instructions configured to, when executed by the processor apparatus, cause the image processing system to:
   receive input, the input comprising imaging data associated with one of a plurality of first projection formats that are compatible with the decoder apparatus but not the display apparatus, the plurality of first projection formats each having a higher encoding efficiency than a second projection format;
   cause encode of the one first projection format via at least the encoder apparatus to produce an encoded first projection format;
   cause decode of the encoded first projection format via at least the decoder apparatus, the decode comprising conversion of the encoded first projection format to the second projection format, the second projection format having a higher rendering efficiency than the first projection format, the conversion configured to occur during the decode so as to obviate a separate conversion subsequent to the decode; and
   cause display of the second projection format via the display apparatus, the display apparatus configured to support the second projection format but none of the plurality of first projection formats.

2. The image processing system of claim 1, wherein the plurality of instructions are further configured to, when executed by the processor apparatus, cause the image processing system to encode metadata information associated with the one first projection format, the one first projection format comprising an intermediate projection format exclusive of the second projection format.

3. The image processing system of claim 2, wherein the conversion of the encoded one first projection format is based at least on the encoded metadata information.

4. The image processing system of claim 1, wherein the plurality of instructions are further configured to, when executed by the processor apparatus, cause the image processing system to correct the first projection format during the encode to stabilize one or more frames associated with the received input, the correction comprising an application of a rotation operation to the first projection format.

5. The image processing system of claim 4, wherein the one first projection format comprises a derivation of a different one of the plurality of first projection formats.

6. The image processing system of claim 1, wherein the one first projection format comprises a rotated sphere projection, the rotated sphere projection comprising one or more portions of a spherical image, each of the one or more portions comprising a 270° by 90° field of view.

7. The image processing system of claim 1, wherein the one first projection format comprises an equal area cubemap projection.

8. The image processing system of claim 1, wherein the second projection format comprises an equirectangular projection format.

9. A method for image processing, the method performed by an image processing system comprising a processor apparatus, an encoder apparatus, a decoder apparatus, and a display apparatus, the method comprising:
   receiving, by the image processing system, input, the input comprising imaging data associated with one of a plurality of first projection formats that are compatible with the decoder apparatus but not the display apparatus, the plurality of first projection formats each having a higher encoding efficiency than a second projection format;
   causing, by the image processing system, encode of the one first projection format via at least the encoder apparatus to produce an encoded first projection format;
   causing, by the image processing system, decode of the encoded first projection format via at least the decoder apparatus, the decode comprising conversion of the encoded first projection format to the second projection format, the second projection format having a higher rendering efficiency than the first projection format, the conversion configured to occur during the decode so as to obviate a separate conversion subsequent to the decode; and
   causing, by the image processing system, display of the second projection format via the display apparatus, the display apparatus configured to support the second projection format but none of the plurality of first projection formats.

10. The method of claim 9, further comprising encoding, by the image processing system, metadata information associated with the one first projection format, the one first projection format comprising an intermediate projection format exclusive of the second projection format.

11. The method of claim 10, wherein the conversion of the encoded one first projection format is based at least on the encoded metadata information.

12. The method of claim 9, further comprising correcting, by the image processing system, the first projection format during the encode to stabilize one or more frames associated with the received input, the correction comprising an application of a rotation operation to the first projection format.

13. The method of claim 12, wherein the one first projection format comprises a derivation of a different one of the plurality of first projection formats.

14. The method of claim 9, wherein the one first projection format comprises a rotated sphere projection, the rotated sphere projection comprising one or more portions of a spherical image, each of the one or more portions comprising a 270° by 90° field of view.

15. The method of claim 9, wherein the one first projection format comprises an equal area cubemap projection.

16. The method of claim 9, wherein the second projection format comprises an equirectangular projection format.

* * * * *